United States Patent [19]

Mumcu et al.

[11] 4,345,052

[45] Aug. 17, 1982

[54] METHOD FOR THE PREPARATION OF POLYETHER ESTER AMIDES

[75] Inventors: Salih Mumcu, Marl; Hans J. Panoch, Haltern, both of Fed. Rep. of Germany

[73] Assignee: Chemische Werke Hüls AG, Marl, Fed. Rep. of Germany

[21] Appl. No.: 169,111

[22] Filed: Jul. 10, 1980

[30] Foreign Application Priority Data

Aug. 9, 1979 [DE] Fed. Rep. of Germany ....... 2932234

[51] Int. Cl.$^3$ ...................... C08L 77/02; C08L 77/12
[52] U.S. Cl. .................................... 525/411; 525/420; 525/519; 525/926; 525/927; 528/488; 528/492; 528/494
[58] Field of Search ............... 525/519, 926, 927, 411, 525/420; 528/492, 494, 288

[56] References Cited

U.S. PATENT DOCUMENTS

| | | | |
|---|---|---|---|
| 3,660,356 | 5/1972 | Radlmann et al. | 525/926 |
| 3,839,245 | 10/1974 | Schlossman et al. | 525/926 |
| 4,238,582 | 12/1980 | Deleens et al. | 525/926 |
| 4,252,920 | 2/1981 | Deleens et al. | 525/926 |

FOREIGN PATENT DOCUMENTS

1473972 5/1977 United Kingdom .

*Primary Examiner*—John Kight, III
*Assistant Examiner*—Amelia B. Yarbrough
*Attorney, Agent, or Firm*—Wells & Wells

[57] ABSTRACT

Method for manufacturing polyether ester amides by polycondensing at ordinary or reduced pressure, optionally in the presence of catalysts. A hot melt of:

(a) polyamides having carboxyl end groups with polyethers having hydroxyl end groups and amino end groups;
(b) polyamides having carboxyl end groups and polyethers having hydroxyl end groups;
(c) polyamides having carboxyl end groups with polyethers having amino end groups; or
(d) polyamides having amino end groups with polyethers having carboxyl end groups;

is treated at temperatures from about 200° to 300° C. and at a water vapor pressure of about 5 to 25 bars with mechanical agitation and after water is removed by decompression the polycondensation of the polyether ester amide is carried out.

10 Claims, No Drawings

METHOD FOR THE PREPARATION OF POLYETHER ESTER AMIDES

CROSS REFERENCE TO A RELATED APPLICATION

Applicants claim priority under 35 USC 119 for application No. P 29 32 234.7, filed Aug. 9, 1979 in the Patent Office of the Federal Republic of Germany.

BACKGROUND OF THE INVENTION

The field of the invention is polyether ester amides.

The state of the art of preparing polyether ester amides may be ascertained by reference to British Pat. No. 1,211,118 and British Pat. No. 1,473,972; West German Published Application No. 2,658,714 and U.S. Pat. Nos. 3,428,710; 3,489,816; 3,944,629; 3,993,709; and 4,207,410, the disclosures of which are incorporated herein.

The preparation of polyether ester amides, also referred to as block polyamide polyether esters, is known.

The following procedures are manufacturing processes of the prior art; the polycondensation of a polyamide forming monomer, for instance lactams, omega-aminocarboxylic acids, or equivalent amounts of dicarboxylic acids and diamines with a polyether having end located amino groups in the presence of dicarboxylic acids or with a polyether having end located carboxyl groups in the presence of diamines; and polycondensation of a polyether with polyamide oligomers including either carboxyl end groups or amine end groups. These prior art processes are disclosed in West German Published Application No. 2,658,714; British Pat. Nos. 1,211,118 and 1,473,972 and U.S. Pat. Nos. 3,428,710; 3,489,816 and 4,207,410.

It is known that polyethers and polyamides are mutually incompatible. Due to the heterogeneity of the reaction components, polycondensation takes place very slowly. Furthermore, only molded materials having a high extract content and relatively low molecular weights are obtained, so that inadequate stability is incurred in the molded articles made by injection molding and especially by the extrusion process.

Furthermore, desirable products are not obtained either when catalysts are used which require high concentrations and processing under reduced pressure or mechanical mixing. Products prepared in the presence of such catalysts as tetraalkylorthotitanate in the high concentrations required of up to 2% by weight are not resistant to hydrolysis.

Operating under reduced pressure requires a much higher cost of apparatus but the problem of heterogeneity of the reaction components nevertheless remains. Mechanical mixing, such as stirring, presents difficulties, or stirring becomes impossible to implement adequately as the reaction proceeds.

U.S. Pat. No. 4,207,410 teaches that relatively high molecular weights are achieved in the absence of a catalyst provided the monomeric components are introduced simultaneously. This procedure however, is not fully satisfactory because the temperature sensitive polyethers are subjected to thermal stresses during a relatively long production time, whereby minor thermal damage is obvious. This thermal damage results in the degradation of the mechanical properties of the polyether ester amides.

SUMMARY OF THE INVENTION

Having in mind the limitations of the prior art, it is an object of the present invention to convert the immiscible polyamide and polyether components into high molecular weight products in an essentially shorter production time and free of prior art limitations. The reaction speed is furthermore adequately rapid and only slight concentrations of catalysts or no catalysts are used. The use of a high vacuum is eliminated as much as possible.

The object is achieved according to the present invention by carrying out a polycondensation under atmospheric or sub-atmospheric pressure, in the presence or absence of catalysts, where the components are:

(a) polyamides having carboxyl end groups and polyethers having hydroxyl end groups and amino end groups;

(b) polyamides having carboxyl end groups and polyethers having hydroxyl end groups;

(c) polyamides having carboxyl end groups and polyethers having amino end groups; or (d) polyamides having amino end groups and polyethers having carboxyl end groups; and prior to polycondensation:

(e) treating the polyamides and polyethers in a hot melt at a temperature of about 200°–300° C. and at a water vapor pressure of about 5 to 25 bars while being mechanically agitated;

(f) removing water from the moisture treatment step by expansion; and (g) then carrying out the polycondensation.

The preferred water vapor pressure is from 10 to 20 bars. The time of treatment under water vapor pressure is about 15 minutes to 4 hours, preferably 30 minutes to 2 hours.

DESCRIPTION OF PREFERRED EMBODIMENTS

It is essential to start with the "polyamide" and that the polyamide be treated together with the polyether under water vapor pressure. The polyamide is hydrolyzed in the atmosphere of water vapor pressure and is present in the form of a low molecular oligomer. Even though the polyamide chains are formed again after decompression by expansion, a fine distribution of the polyether component remains, i.e., surprisingly the fine distribution formed under water vapor pressure is retained.

By "polyamides" are meant: polyamides or oligoamides bearing carboxyl end groups or amino end groups. These polyamides are obtained according to known methods (Kirk-Othmer, Encyclopedia of Chemical Technology, 2nd Edition, Vol. 16, pages 1–46) by regulating chain length with dicarboxylic acids or diamines. In other words, these pre-formed polyamides can be used as the raw materials.

However, it is especially advantageous to prepare the "polyamides" by hydrolytic polymerization, at temperatures of 200° to 320° C. and in the presence of water, under the natural pressure generated thereby of 5 to 25 bars, and then to add the polyether to the preformed "polyamides". The required treatment is then carried out in the same vessel as the polymerization with mechanical motion and with water vapor pressure, and after the water is removed, the polycondensation into the polyether ester amides is carried out. Addition of the polyether in many cases is possible into the pressurized reactor containing the "polyamide". However, where required, the reactor can first be decompressed, and then the polyether and the water are added thereinto.

Once the required intermediate treatment at water vapor pressure is completed, the water is removed by expansion and the polycondensation then is carried out at ordinary or reduced pressure of about 100 to 1 mbars and temperatures of about 230° to 300° C., preferably 250° to 280° C., until completion, in conventional manner.

Where desired, the process is also carried out in the presence of known catalysts such as phosphoric acid, zinc acetate, calcium acetate or tetraalkyltitanates and low concentrations are sufficient. Preferably, phosphoric acid is used. The amount of catalyst used is about 0.02 to 0.2% by weight referred to the sum of the polyethers and polyamides used. The amount of water required to generate the desired water vapor pressure depends on the reactor size, temperature, filling level in the reactor and the molar ratio of the polyamide forming compounds, lactams, omega-aminocarboxylic acids, dicarboxylic acids and the diamines to the excess dicarboxylic acids and diamines used as regulators. For an approximate 50% filling level of the reactor, the amount of water as a rule is about 1 to 30, preferably 2 to 20% by weight referred to the amount of polyamide forming compounds.

The degree of precondensation of the "polyamides" is determined by the excess of the dicarboxylic acids or diamines.

The related saturated water vapor pressure is not reached in the intermediate treatment under water vapor pressure, which also may be designated as a homogenizing stage. Part of the water still present or reintroduced is used to degrade the polyamide blocks formed.

The following components are used:

I. POLYAMIDE FORMING COMPONENTS

Lactams or omega-aminocarboxylic acids having 10 to 12 atoms, equimolar amounts of diamines and dicarboxylic acids, or mixtures of these components, preferably lauryl lactam, omega-aminododecanoic acid, omega-aminoundecanoic acid, dodecamethylene diamine and decane dicarboxylic acid.

II. COMPONENTS FOR THE POLYAMIDES, REGULATING THE MOLECULAR WEIGHTS (a) aliphatic linear dicarboxylic acids having 6 to 13 C atoms, branched-chain aliphatic dicarboxylic acids having 6 to 13 C atoms in the chain, cycloaliphatic dicarboxylic acids and aromatic dicarboxylic acids having at least 8 C atoms or mixtures of these compounds. For instance, adipic acid, trimethyl adipic acid, pimelic acid, suberic acid, azelaic acid, sebacic acid, decane dicarboxylic acid, hexahydroterephthalic acid, terephthalic acid, isophthalic acid, phthalic acid, naphthalene dicarboxylic acid, preferably decane dicarboxylic acid, hexahydroterephthalic acid and terephthalic acid.

(b) linear aliphatic diamines having 6 to 13 C atoms, branched-chain aliphatic diamines having 6 to 13 C atoms in the chain, cycloaliphatic and aromatic diamines or also mixtures of these compounds; for instance, 5-methyl-nonanediamine; hexamethylene diamine, 2,4,4-trimethylhexamethylene diamine; dodecamethylene diamine; isophorone diamine; m-xylylene diamine and p-xylylene diamine; 1,4-bis-(aminomethyl)-cyclohexane; 4,4'-diaminodicyclohexyl methane; and 4,4'-diaminodiphenyl methane. Preferred are isophorone diamine, hexamethylene diamine and dodecamethylene diamine.

Those "polyamides" preformed from components I and (II)a or II(b). The polycondensation is carried out either directly by adding polyethers, homogenizing, removing the water and then carrying out the polycondensation into polyether ester amides or as already described, in lieu of this single pot method, the raw materials may be specially prepared polyamides. The mechanical mixing in the homogenizing stage is preferably in the form of stirring.

The average quantitative molecular mass of the polyamide blocks, which, as already mentioned, is determined by the excess of component II, is represented approximately by the following formula:

$$M_{II}(1+m_I/m_{II}),$$

where
$M_{II}$=molecular mass of component II
$m_I$=amount in grams of component I used
$m_{II}$=amount in grams of component II used.

III. POLYETHERS

Homopolymers and/or copolymers of ethylene oxide, propylene oxide and tetrahydrofuran or mixtures of the homopolymers and/or copolymers. The numerical mean of the molecular mass is between about 160 and 3,000, preferably between 300 and 2,200 and especially between 500 and 1,200. Especially when polyamides I and II(a) are used, the polyethers have OH and/or $NH_2$ end groups. When polyamides I and II(b) are used, the polyethers have carboxyl end groups. The tetrahydrofuran polyethers are preferred.

The $NH_2$ end groups are introduced by known methods, for instance the methods described in West Germany Published Applications Nos. 15 70 542; 24 12 056; and 24 12 057 and U.S. Pat. No. 2,401,607. Carboxyl end groups are introduced for instance by the method disclosed in German Published Application No. 26 58 714.

The weight ratio of components (I+II) to III is from about 35/65 to 95/5, preferably 40/60 to 90/10. The molar ratio of II/III is from about 1/0.95 to 1/1.10, preferably from 1/1 to 1/1.05.

The polyether ester amides and polyetheramides may also comprise additives such as antioxidants, heat and light stabilizers, flame proofing agents, dyestuffs and softeners, which may be added before, during or after polycondensation.

The solution viscosities are from about 1.3 to 2.4, preferably between 1.5 and 2.2, measured in m-cresol at 25° C. according to German Industrial Standard DIN 53 727.

EXAMPLE 1

280 kg of lauryllactam; 13 kg of adipic acid and 12.6 kg of water were heated in a one cubic meter agitated autoclave to 270° C., while excluding air and an internal pressure of 18 bars is generated. After a 7-hour pressure phase, 107 kg of alpha-omega-dihydroxy-(polytetrahydrofuran) with $\overline{M}_n$=1,200 were added to the pressurized reactor, which then was stirred at about 20 bars at a temperature range from 230° to 270° C. for 2 hours. The reactor was decompressed within 2 hours. Polycondensation took place under ordinary pressure, with the passage of nitrogen at 5 m³/h thereover.

Samples were removed at 6-hour intervals from the reaction substances and their solution (relative viscosities) were determined in m-cresol. The following relative viscosity values were measured:

| time of polycondensation (hr) | Relative viscosity |
| --- | --- |
| 6 | 1.51 |
| 12 | 1.65 |
| 18 | 1.90 |

The melting point of the final product is 168° C. (measured by the Differential Thermo Calorimetric [DSC] method). The extract content in hot ethanol is 2.3% by weight.

CONTROL EXAMPLE 1 (U.S. Pat. Nos. 3,428,710 and 3,489,816 method)

280 kg of lauryllactam; 13 kg of adipic acid and 12.6 kg of water were heated to 270° C. in a one cubic meter agitated autoclave excluding air with an internal pressure of 18 bars generated therein. After a pressurized phase of 7 hours, decompression was carried out in 2 hours. Then 107 kg of alpha, omega-dihydroxy-(polytetrahydrofuran) with $\overline{M}_n = 1,200$ were added and polycondensation was carried out at ordinary pressure and nitrogen was passed at 5 m³/h at 270° C. Samples were removed at 6-hour intervals from the substance of reaction and the relative viscosities of solution were determined in m-cresol.

| time of polycondensation (hr) | Relative viscosity |
| --- | --- |
| 6 | 1.30 |
| 12 | 1.53 |
| 18 | 1.61 |
| 24 | 1.67 |
| 30 | 1.80 |

The end product has a DSC melting point of 168° C. Its extract content in hot ethanol is 3.6% by weight.

EXAMPLE 2

16 kg of lauryllactam; 0.7 kg of dodecane diacid and 750 ml of water were heated to 270° C. in a 50 liter agitated autoclave with exclusion of air and an internal pressure of 19 bars was generated. After a 7-hour pressurized phase, 3.3 kg of polytetrahydrofuran diamine ($\overline{M}_n = 1,000$) were added, which had been prepared by cyano-ethylating and hydrogenating an alpha,omega-dihydroxy-(polytetrahydrofuran). This mixture was stirred for 2 hours at about 22 bars within a temperature range of 230°–270° C. Then the reactor was decompressed within 2 hours. Polycondensation took place at ordinary pressure, 200 l/h of nitrogen being passed thereover. Samples were removed at 4-hour intervals from the reaction substance and their relative viscosities of solution were tested in m-cresol. The following relative viscosities were obtained:

| polycondensation time (hr) | relative viscosity |
| --- | --- |
| 4 | 1.53 |
| 8 | 1.85 |
| 12 | 2.05 |

The melting point of the final product is 174° C. (measured by the DSC method). Its extract content in hot ethanol is 1.6%.

CONTROL EXAMPLE 2 (British Patent 1,211,118 method)

16 kg of lauryllactam; 0.7 kg of dodecane diacid and 3.3 kg of polytetrahydrofuran diamine ($\overline{M}_n = 1,100$) which had been prepared by cyanoethylating and hydrogenating an alpha,omega-dihydroxy(polytetrahydrofuran) were heated to 270° C. in a 50-liter agitated autoclave. After 10 hours, 200 l/h of nitrogen are passed over and polycondensation is implemented. Samples were removed at 4-hour intervals and their relative viscosities of solution were determined. The following relative viscosity values were obtained:

| polycondensation time (hr) | relative viscosity |
| --- | --- |
| 4 | 1.50 |
| 8 | 1.68 |
| 12 | 1.88 |

The DSC melting point of the final product is 170° C. and its extract content in hot ethanol is 5.9% by weight.

EXAMPLE 3

260 kg of lauryllactam; 26 kg of dodecane diacid and 11.7 kg of water were heated in a one cubic meter agitated autoclave to 270° C. with air excluced, an internal pressure of 18 bars being generated. After a pressurized phase of 6 hours, 114 kg of alpha,omega-dihydroxy-(polytetrahydrofuran) with a mean numerical molar mass of 1,000 and 0.3 kg of tetraisopropylorthotitanate were added, the substance of reaction then being stirred for 2 hours between 230° and 260° C. The reactor was decompressed within 2 hours, the temperature being raised to 270° C. Thereupon, a vacuum of 20 mbars was applied within 3 hours and maintained for 10 hours. The product obtained has a relative viscosity value of 1.90 and a DSC melting point of 167° C. Its extract content in hot ethanol is 2.2% by weight.

CONTROL EXAMPLE 3 (British Patent 1,473,972)

260 kg of lauryllactam, 26 kg of dodecane diacid and 11.7 kg of water were heated to 270° C. in a one cubic meter agitated autoclave with air excluded, an internal pressure of 18 bars being generated. After a 6-hour pressurized phase, decompression was carried out within 2 hours. A polyamide 12-dicarboxylic acid with an average numerical molecular mass of 2,530 was obtained. 114 kg of alpha,omega-dihydroxy-(polytetrahydrofuran) with a mean numerical molar mass of 1,000 and 2 kg of tetraisopropylorthotitanate were added to this polyamide 12-dicarboxylic acid and the components of reaction were heated to 270° C. within 2 hours. Thereupon a vacuum of 0.3 mbars was applied within 3 hours and polycondensation proceeded at this vacuum for 10 hours. The product so obtained has relative viscosity value of 1.92 and a DSC melting point of 167° C. Its extract content in hot ethanol amounts to 3.4% by weight.

EXAMPLE 4

280 kg of lauryllactam; 25 kg of dodecane diacid and 12.6 kg of water were heated to 270° C. within 4 hours in a one cubic meter agitated autoclave, an internal pressure of 18 bars being generated. After a 7-hour pressure phase, 95 kg of alpha,omega-dihydroxy-(polytetrahydrofuran) with $\overline{M}_n = 1,000$ were added, and stirring proceeded for 2 hours at 20 bars within a temperature range of 230° to 250° C., which was followed by decompression for 2 hours with the temperature raised to 270° C. Polycondensation then took place at ordinary pressure with the passing of nitrogen thereover. After 24 hours a product with a relative viscosity value of 1.92 was obtained. A tear resistance of 30 N/mm$^2$ per German Industrial Standard DIN 53 455 was measured on molded articles. The material was extruded into sheets which were free from specks.

CONTROL EXAMPLE 4 (U.S. Pat. No. 4,207,410)

280 kg of lauryllactam; 95 kg of alpha,omega-dihydroxy-(polytetrahydrofuran) with $\overline{M}_n = 1,000$; 25 kg of dodecane diacid and 12.6 kg of water were heated within 5 hours to 270° C. in a one cubic meter agitated autoclave, an internal pressure of 18 bars being generated. After a 7-hour pressure phase, decompression was carried out in 2 hours. The polycondensation took place at ordinary pressure with the passing of nitrogen thereover. After 26 hours a product with a relative viscosity value of 1.83 was obtained. A tear resistance according to German Industrial Standard DIN 53 455 of 20 N/mm$^2$ was determined. The material was extruded into films. These films contained slight fish-eyes consisting of gel particles.

EXAMPLE 5

8 kg of omega-aminoundecanoic acid and 1.2 kg of hexahydroterephthalic acid were heated at 0.5 bars gauge pressure of nitrogen in a 50 liter agitated autoclave to 270° C. After 3 hours, 600 ml of water and 11.2 kg of polyethylene oxide diamine ($\overline{M}_n = 1,620$) were added, the latter having been prepared by cyanoethylating and hydrogenating polyethylene oxide glycol. This mixture was stirred for 1 hour at 17 bars pressure and at a temperature between 230° and 260° C. The substance of reaction was polycondensed at ordinary pressure for 8 hours, with the passing of nitrogen. The product obtained had a relative solution viscosity of 1.8.

EXAMPLE 6

7.46 kg of dodecane diacid and 4.65 kg of dodecamethylene diamine were heated in the presence of 700 ml of water and 12 g of 85% aqueous phosphoric acid to 260° C. in a 50 liter agitated autoclave, an internal pressure of 17 bars being generated. After stirring for 3 hours, the pressure was lowered to 10 bars. Then 8.2 kg of alpha,omega-dihydroxy(polytetrahydrofuran) with $\overline{M}_n = 860$ were added, and the mixture was stirred for 2 hours at 230° to 260° C. at about 12 bars. The reactor then was decompressed within 1 hour. Nitrogen was passed over the mixture for 3 hours at 260° C., a vacuum of 20 mbars was applied within 2 hours, and polycondensation was carried out for 7 hours. The relative solution viscosity of the end product was 2.05.

EXAMPLES 7 THROUGH 22

[These samples show the effect of time and water vapor pressure in the homogenizing stage on the rate of polycondensation.]

14 kg of lauryllactam; 1.27 kg of dodecane diacid and 670 ml of water were heated to 270° C. in a 50 liter agitated autoclave, with the exclusion of air, an internal pressure of 20 bars being generated. After a 7-hour pressure phase, 4.9 kg of alpha,omega-hydroxy-(polytetrahydrofuran) with $\overline{M}_n = 860$ were put into the reactor at various pressures (see the following table) and the mixture was stirred at a temperature between 230° and 270° C. for varying lengths of time (see the following table). In all examples the decompression was carried out within 1½ hours. The substance of reaction was polycondensed at ordinary pressure with nitrogen passing over it. The table shows the relative solution viscosities measured for the end products:

| Example No. | Pressure | Time (hr) | Relative Viscosity |
|---|---|---|---|
| 7 | 2 | ½ | 1.60 |
| 8 | 2 | 1 | 1.62 |
| 9 | 2 | 2 | 1.66 |
| 10 | 2 | 4 | 1.68 |
| 11 | 5 | ½ | 1.65 |
| 12 | 5 | 1 | 1.68 |
| 13 | 5 | 2 | 1.72 |
| 14 | 5 | 4 | 1.76 |
| 15 | 10 | ½ | 1.88 |
| 16 | 10 | 1 | 1.93 |
| 17 | 10 | 2 | 1.95 |
| 18 | 10 | 4 | 1.95 |
| 19 | 20 | ½ | 1.93 |
| 20 | 20 | 1 | 1.95 |
| 21 | 20 | 2 | 1.95 |
| 22 | 20 | 4 | 1.96 |

EXAMPLE 23

280 kg of lauryllactam; 23.8 kg of dodecamethylene diamine and 12.6 kg of water were heated to 270° C. within 4½ hours in a one cubic meter agitated autoclave while excluding air and an internal pressure of 18 bars was generated. After a pressure phase of 8 hours, 100 kg of polytetrahydrofuran with carboxyl end groups ($\overline{M}_n = 810$) were put into the pressurized reactor, and the mixture was stirred for 90 minutes at about 20 bars within the temperature range of 230° to 270° C. The reactor then was decompressed within 2 hours. Polycondensation took place next for 5 hours with the passing of nitrogen. Then the inside pressure was lowered within 2 hours to 20 mbars and the polycondensation was continued at that pressure for 4 hours. The melt was easily removed and granulated following cooling. The product so obtained has a relative viscosity value of 1.97 and a melting point of 172° C. (measured by DSC). It contains no gel particles.

CONTROL EXAMPLE (German Published Application 26 58 714 Method)

280 kg of lauryllactam; 100 kg of polytetrahydrofuran with carboxyl end groups (means numerical molecular mass = 810); 23.8 kg of dodecamethylene diamine and 12.6 kg of water were heated to 270° C. within 5 hours in a one cubic meter agitated autoclave, an internal pressure of 19 bars being generated. After a pressure phase of 8 hours, decompression was carried out within 2 hours. The polycondensation was first carried out for 5 hours with nitrogen passing. Then the pressure within the autoclave was lowered within 2 hours to 20 mbars and the polycondensation continued at that pressure for 4 hours. There were difficulties when the product was removed because the polymer filament issued unevenly from the die and frequently would tear. The product obtained was a relative viscosity value of 1.85 and a DSC melting point of 172° C. The product contains minute gel particles, which are especially visible in sheets.

EXAMPLE 24

171 kg of dodecane diacid; 149 kg of dodecamethylene diamine and 13.9 kg of isophorone diamine were heated within 5 hours to 280° C. in the presence of 80 kg of water in a one cubic meter agitated autoclave, while excluding air, the internal pressure being kept at 18 to 20 bars by continuous decompression. Thereupon the pressure was reduced within 2 hours to 10 bars. 69 kg of polytetrahydrofuran with carboxyl end groups (mean numerical molecular mass=810) were put into the pressurized reactor and the mixture was stirred at about 12 bars and a temperature of 230° to 270° C. for 2 hours. The excess pressure was relieved within 2 hours. The polycondensation was carried out with the passing of 5 m$^3$/h of nitrogen. After 13 hours a product with a relative viscosity value of 1.95 was obtained. This substance has a DSC melting point of 176° C. and was processed at 210° C. and a pressure of 40 bars into compressed plates. These plates were subjected to oscillating torsion tests at a rate of 1 hz. The material modulus of torsion at 20° C. is 270 N/mm$^2$, the glass transition temperature is 7° C.

We claim:

1. A method for preparing polyether ester amides, comprising:
   (A) preparing a mixture of polyamides and polyethers selected from the group consisting of
      (a) polyamides having carboxyl end groups and polyethers having hydroxyl end groups and amino end groups;
      (b) polyamides having carboxyl end groups and polyethers having hydroxyl end groups;
      (c) polyamides having carboxyl end groups and polyethers having amino end groups; and
      (d) polyamides having amino end groups and polyethers having carboxyl end groups;
   (B) treating the mixture of (A) as a hot melt at a temperature between about 200° to 300° C. and under a water vapor pressure of about 5 to 25 bars with mechanical agitation for a period of about 15 minutes to 4 hours;
   (C) removing the water from (B) by decompression; and
   (D) carrying out a polycondensation of said treated, water free mixture.

2. The method of claim 1, wherein the polycondensation of (D) is carried out at atmospheric pressure.

3. The method of claim 1, wherein the polycondensation of (D) is carried out at a pressure reduced below atmospheric.

4. The method of claim 1, wherein the polycondensation of (D) is carried out in the presence of catalysts.

5. The method of claim 1, wherein the vapor pressure of (B) is 10 to 20 bars and step (B) is carried out for a period of 15 minutes to 4 hours.

6. The method of claim 1, wherein the amount of water used in step (B) is about 1 to 30% by weight of said mixture.

7. The method of claim 3, wherein said pressure is about 100 to 1 mbars.

8. The method of claim 7, wherein the temperature of polymerization for step (D) is about 230°-300° C.

9. The method of claim 1, wherein said polymerization step (D) is carried out for sufficient time to achieve a relative viscosity of the resulting polyether ester amides of about 1.3 to 2.4.

10. The method of claim 9, wherein said relative viscosity is about 1.5 to 2.2.

* * * * *